Nov. 4, 1952     W. A. MILAM     2,616,200
DECOY SPREADER

Filed March 13, 1950     2 SHEETS—SHEET 1

William A. Milam
INVENTOR.

BY *Clarence A. O'Brien*
*and Harvey B. Jackson*
Attorneys

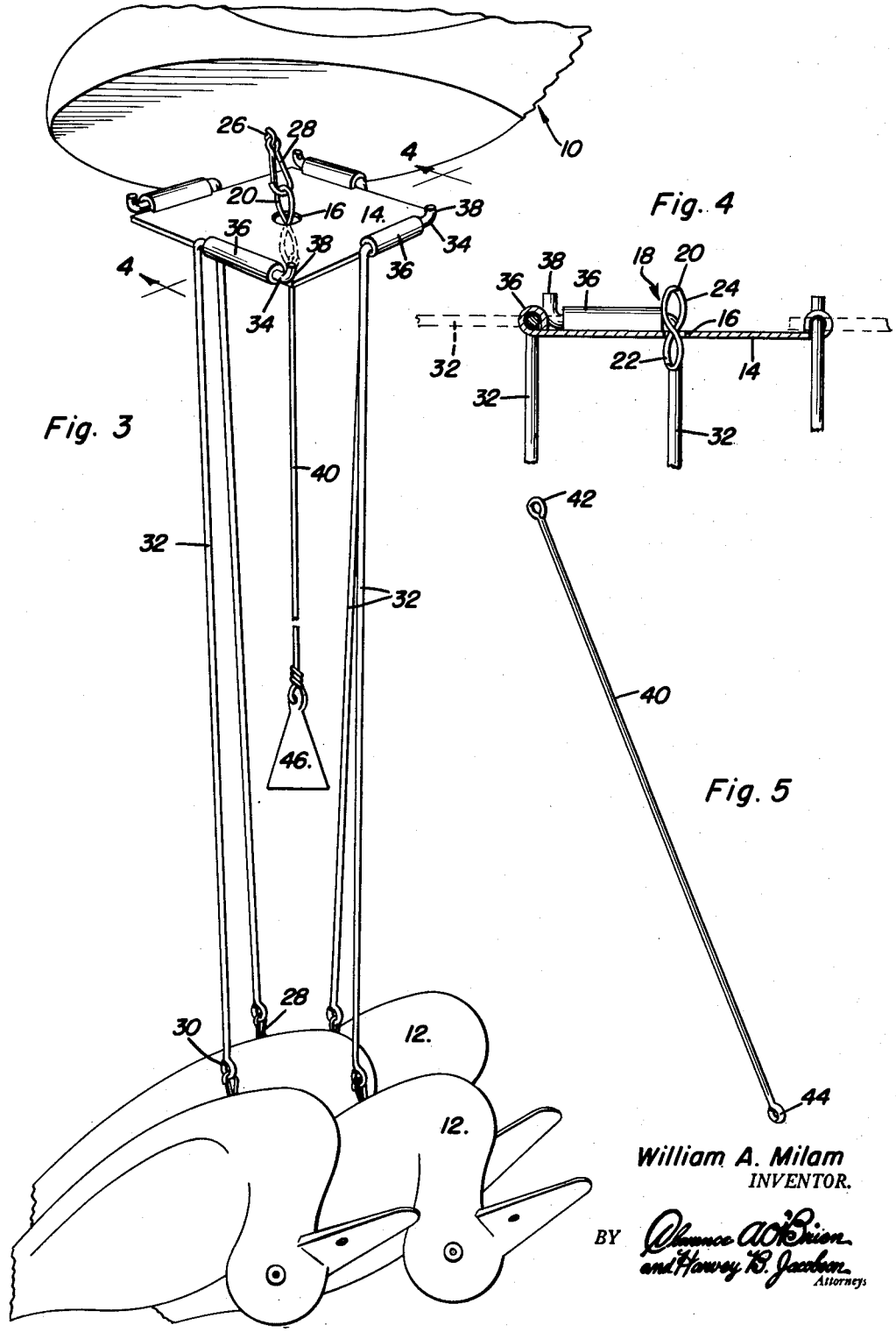

Patented Nov. 4, 1952

2,616,200

UNITED STATES PATENT OFFICE 2,616,200

DECOY SPREADER

William A. Milam, Longview, Tex.

Application March 13, 1950, Serial No. 149,341

3 Claims. (Cl. 43—3)

1

This invention comprises novel and useful improvements in a decoy spreader and more specifically pertains to a mechanical decoy spreader which will position a plurality of duck or goose decoys in a more realistic and natural formation while conveniently retaining the individual decoys in an assembly which may be readily and compactly collapsed for storage and transportation.

The principal object of this invention is to provide a mechanical spreader of an improved construction facilitating the ease of spreading the decoy and of collapsing the same for transportation and storage, and without necessitating immersion of the hands of the user during launching or retrieving the decoys.

A further important object of the invention is to provide an improved construction of mechanical spreader which will assure a spreading of the individual decoy elements in a more natural and realistic formation, thereby increasing the efficiency of the device.

A still further object of the invention is to provide an improved mechanical decoy spreader which may be readily folded into compact position for transportation and storage by merely lifting the device at a single point or portion thereof.

A still further important object of the invention resides in the provision of a mechanical decoy in conformity with the foregoing objects which will eliminate the necessity for individual anchors for the decoy elements; will facilitate the moving of the decoy elements from one location to another without permitting the decoys to become entangled or lose formation; and which is capable, by a single launching operation, for effecting the proper positioning of the individual decoy elements.

These, together with various ancillary features and objects of the invention which will later become apparent as the following description proceeds, are attained by the present invention, a preferred embodiment of which has been illustrated by way of example only in the accompanying drawings, wherein:

Figure 3 is a fragmentary side elevational view

Figure 1:
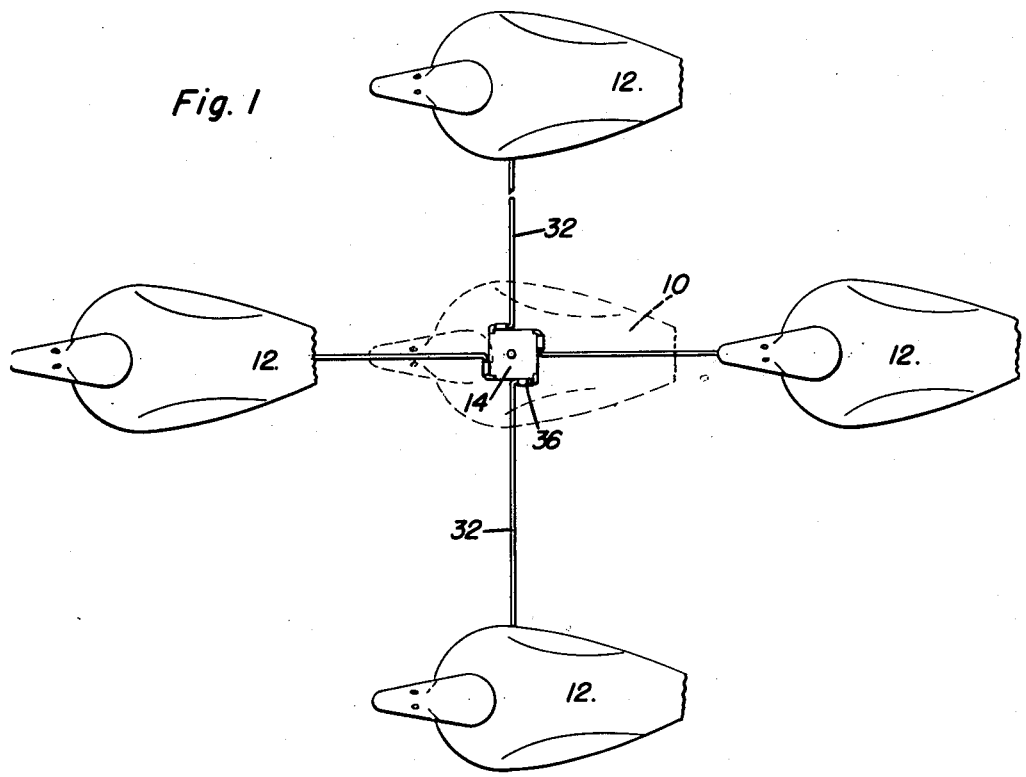
Figure 1 is a top plan view illustrating the decoy spreader in its operative position, the main decoy element being indicated in dotted lines therein in order to illustrate the construction of the spreader associated with the under surface thereof.

2 showing the decoy spreader in its collapsed position for storage and transportation;

Figure 4 is a fragmentary vertical transverse sectional view taken substantially upon the plane indicated by the section line 4—4 of Figure 4 and showing certain structural details of the decoy spreader; and Figure 5 is a perspective view showing a connecting link for securing an anchor to the device.

Referring now more specifically to the accompanying drawings, wherein like numerals designate similar parts throughout the various views, it will be seen that the device comprises a plurality of decoy elements which may be in the form of ducks, geese, or the like, the same consisting of a central or main decoy element 10 together with a plurality of secondary or auxiliary decoy elements which have been designated 12, and which may be of the same or of a different construction or appearance, if desired. The main purpose of this invention is to provide a means for maintaining in associated relation and in a natural formation in use the main duck decoy and the auxiliary or secondary decoy elements. For this purpose, there is provided a support bar to which may conveniently, as best shown in Figures 3 and 4, comprise a plate or the like 14 of any desired material such as metal or the like, and which may be of any convenient shape, being illustrated as of square construction. At any suitable point, such as disposed axially thereof, the plate 14 is provided with an aperture 16 in which is loosely received a link 18 which is preferably in the form of a figure eight, having eyes at opposite ends thereof, as indicated at 20 and 22, together with a crossed or looped central portion 24 which is received within the aperture 16. This link thus is loosely and swivelly received in the aperture 16, since the eye portions 20 and 22 are of greater diameter than the aperture.

As shown in Figure 3, the bottom surface of the main decoy element 10 is provided with an eye hook or bolt 26 to which is secured a conventional form of snap fastener 28, adapted to engage the upper eyelet 20 of the link. By this means, the support body 14 is loosely and swivelly connected to the under surface of the main decoy element.

Each of the secondary or auxiliary decoy elements 12 is similarly provided on the under surfaces with snap fasteners 28 which are swivelly engaged within eye portions 30 formed at the ends of connecting rods 32 which may be of substantially rigid and inexpensive construction, and which, at their other extremities are provided with substantially perpendicular, but angularly disposed portions 34 which are hingedly received in cylindrical sleeve members 36 which are carried by the support body 14, preferably being formed integrally with the edges thereof as by rolling over a portion of these edges to provide hinged cylinders receiving the crank portion 34 of the connecting rod 32 to hinge the rod to the support body. The extreme end of the angulated crank portion 34 may be perpendicularly turned as at 38 to prevent unintentional withdrawal of the connecting rod from the hinge member 36.

Figure 2:
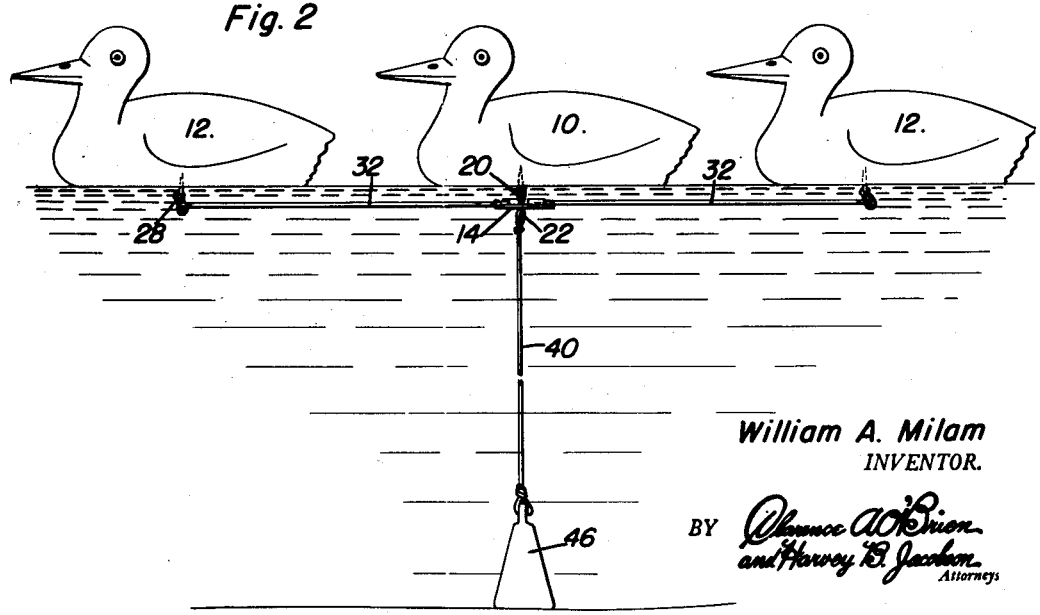
Figure 2 is a side elevational view of the decoy spreader in its operative position.

By this means, it will be seen that each of the auxiliary or secondary decoy elements is hingedly secured to the support body 14 but at a fixed distance therefrom. The arrangement is such, as will be apparent from Figures 3 and 1, that when the main decoy 10 is lifted, the weight of the secondary or auxiliary decoy elements will cause the same to drop from the horizontal position shown in Figures 1 and 2 to an inverted and depending collapsed position as shown in Figure 3.

In order to anchor or secure the decoy device in a desired location, a connecting member in the form of a cable, rod or the like 40 (see Figures 2, 3 and 5) is provided, this connecting member having eyes 42 and 44 at its opposite extremities, which are adapted to be respectively swivelly connected to the eye portion 22 of the link 18, and to an eyelet in the end of an anchor or weight 46.

In positioning the device for use, one motion would serve to simultaneously toss out the decoy device and spread the decoy elements by virtue of their hinged connection to a substantially natural formation of decoys, while the anchor will serve to anchor the device in a desired location. By merely grasping the main decoy element and lifting the same, the entire device will collapse of its own weight into a compact arrangement for transportation and storage.

From the foregoing, the construction and operation of the device, together with its many advantages, will be readily understood and further explanation is believed to be unnecessary. However, since numerous modifications and changes will readily occur to those skilled in the art after a consideration of the foregoing specification and accompanying drawings, it is not desired to limit the invention to the exact construction shown, and described, but all suitable modifications and equivalents may be resorted to, falling within the scope of the appended claims.

Having described the invention, what is claimed as new is:

1. A duck decoy comprising a main decoy duck, a support body, means swivelly connecting said body to said main decoy duck, a plurality of connecting rods each hinged to said body, a plurality of secondary decoy ducks, each pivotally connected at its under side with one of said connecting rods, an anchor connected to said first means, said body having an aperture therethrough, said first means being loosely received through and retained in said aperture, said first means comprising a figure eight link having terminal eyes of greater width than said aperture and disposed on opposite sides of said body, said main decoy duck and said anchor being connected each to one of said eyes.

2. The combination of claim 1 wherein said body comprises a plate, said connecting rods being hinged to the edge of said plate.

3. The combination of claim 1 wherein said body comprises a plate, said connecting rods being hinged to the edge of said plate, each connecting rod comprising a straight, substantially rigid rod, each rod having one end angulated and hingedly engaging said plate.

WILLIAM A. MILAM.

REFERENCES CITED

The following references are of record in the file of this patent:

UNITED STATES PATENTS

| Number | Name | Date |
|---|---|---|
| 677,118 | Coudon | June 25, 1901 |
| 710,433 | Coudon | Oct. 7, 1902 |
| 796,147 | Reynolds | Aug. 1, 1905 |
| 1,836,504 | Prince | Dec. 15, 1931 |